United States Patent
Bevan et al.

(10) Patent No.: US 12,103,666 B2
(45) Date of Patent: Oct. 1, 2024

(54) AIRCRAFT LANDING GEAR ASSEMBLY

(71) Applicants: SAFRAN LANDING SYSTEMS UK LTD, Gloucester (GB); SAFRAN LANDING SYSTEMS CANADA INC, Ajax (CA)

(72) Inventors: Mark Bevan, Gloucester (GB); Pierre-Etienne Dandaleix, Gloucester (GB); Jorge Juesas Portoles, Gloucester (GB); Robert Kyle Schmidt, Gloucester (GB)

(73) Assignees: SAFRAN LANDING SYSTEMS CANADA INC. (CA); SAFRAN LANDING SYSTEMS UK LTD (GB)

( * ) Notice: Subject to any disclaimer, the term of this patent is extended or adjusted under 35 U.S.C. 154(b) by 208 days.

(21) Appl. No.: 17/908,747

(22) PCT Filed: Feb. 26, 2021

(86) PCT No.: PCT/EP2021/054824
§ 371 (c)(1),
(2) Date: Sep. 1, 2022

(87) PCT Pub. No.: WO2021/175712
PCT Pub. Date: Sep. 10, 2021

(65) Prior Publication Data
US 2023/0124974 A1    Apr. 20, 2023

(30) Foreign Application Priority Data
Mar. 2, 2020    (EP) ..................................... 20160347

(51) Int. Cl.
*B64C 25/20*    (2006.01)
*B32B 5/02*    (2006.01)
(Continued)

(52) U.S. Cl.
CPC ................ *B64C 25/20* (2013.01); *B32B 5/02* (2013.01); *B32B 5/26* (2013.01); *B64C 25/62* (2013.01);
(Continued)

(58) Field of Classification Search
CPC ......... B64C 25/20; B64C 25/62; B64C 25/10; B64C 25/58; B32B 5/02; B32B 5/26;
(Continued)

(56) References Cited

U.S. PATENT DOCUMENTS 5,087,503 A * 2/1992 Meatto .................... B29C 70/20
264/258
9,630,467 B2    4/2017 Soles et al.
(Continued)

FOREIGN PATENT DOCUMENTS

DE    102016106379 A1    10/2016
EP    3069993 A1    9/2016

OTHER PUBLICATIONS

Extended European Search Report for European Application No. 20160347.9, dated Sep. 14, 2020, 8 pages.
(Continued)

*Primary Examiner* — Joshua J Michener
*Assistant Examiner* — Cindi M Curry
(74) *Attorney, Agent, or Firm* — Buchanan Ingersoll & Rooney PC

(57) ABSTRACT

An aircraft landing gear assembly having a first landing gear element movably coupled relative to a second landing gear element to move between a first condition and a second condition. The aircraft landing gear assembly further comprises a fibre composite leaf spring formed from a plurality of composite layers and arranged between the first and second elements, the leaf spring being arranged to bend when the first element moves from the first condition to the
(Continued)

second condition. The fibre composite leaf spring comprises a first region and a second region, wherein the number of composite layers in the first region is greater than the number of composite layers in the second region. The landing gear further comprises a mounting assembly arranged to engage the first region of the leaf spring to couple the leaf spring to the first landing gear element.

14 Claims, 12 Drawing Sheets

(51) Int. Cl.
    *B32B 5/26*     (2006.01)
    *B64C 25/62*     (2006.01)
    *F16F 1/368*     (2006.01)

(52) U.S. Cl.
    CPC ........ *F16F 1/3686* (2013.01); *B32B 2250/20* (2013.01); *B32B 2250/44* (2013.01); *B32B 2260/023* (2013.01); *B32B 2260/046* (2013.01); *B32B 2605/18* (2013.01); *F16F 2224/0241* (2013.01); *F16F 2238/022* (2013.01)

(58) Field of Classification Search
    CPC ............ B32B 2250/20; B32B 2250/44; B32B 2260/023; B32B 2260/046; B32B 2605/18; F16F 1/3686; F16F 2224/0241; F16F 2238/022

See application file for complete search history.

(56) References Cited

U.S. PATENT DOCUMENTS

| | | | |
|---|---|---|---|
| 2009/0277992 A1 | 11/2009 | Kismarton | |
| 2013/0001845 A1* | 1/2013 | Voigt | F16F 1/368 |
| | | | 267/158 |
| 2015/0203192 A1 | 7/2015 | Slanker | |
| 2015/0217615 A1* | 8/2015 | Drabon | B60G 11/08 |
| | | | 267/158 |
| 2016/0039514 A1* | 2/2016 | Pitman | B32B 37/20 |
| | | | 156/324 |
| 2016/0207369 A1* | 7/2016 | Krahn | B60G 7/008 |
| 2019/0309814 A1* | 10/2019 | Pleyer | F16F 1/368 |
| 2021/0356010 A1* | 11/2021 | Musselman | B29C 70/46 |
| 2022/0056975 A1* | 2/2022 | Ruiz Dealbert | B29C 70/302 |
| 2022/0089272 A1* | 3/2022 | Bertolini | B64C 13/38 |

OTHER PUBLICATIONS

International Search Report and Written Opinion for International Application No. PCT/EP2021/054824, dated May 3, 2021, 13 pages.

* cited by examiner

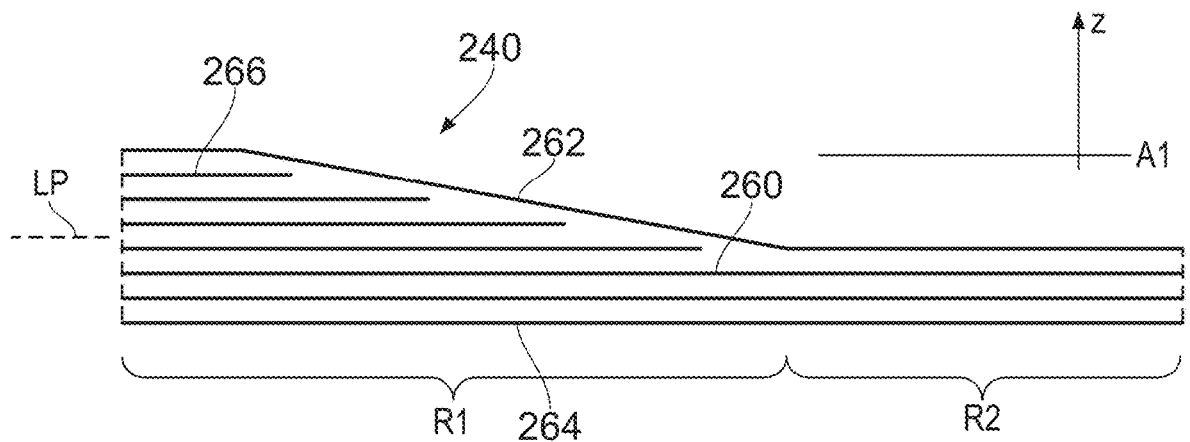
FIG. 4
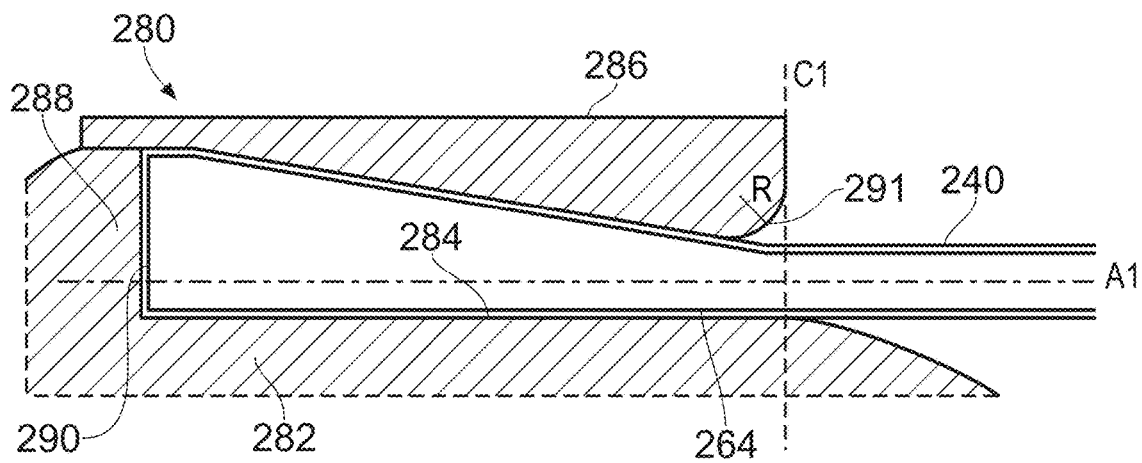
FIG. 5a
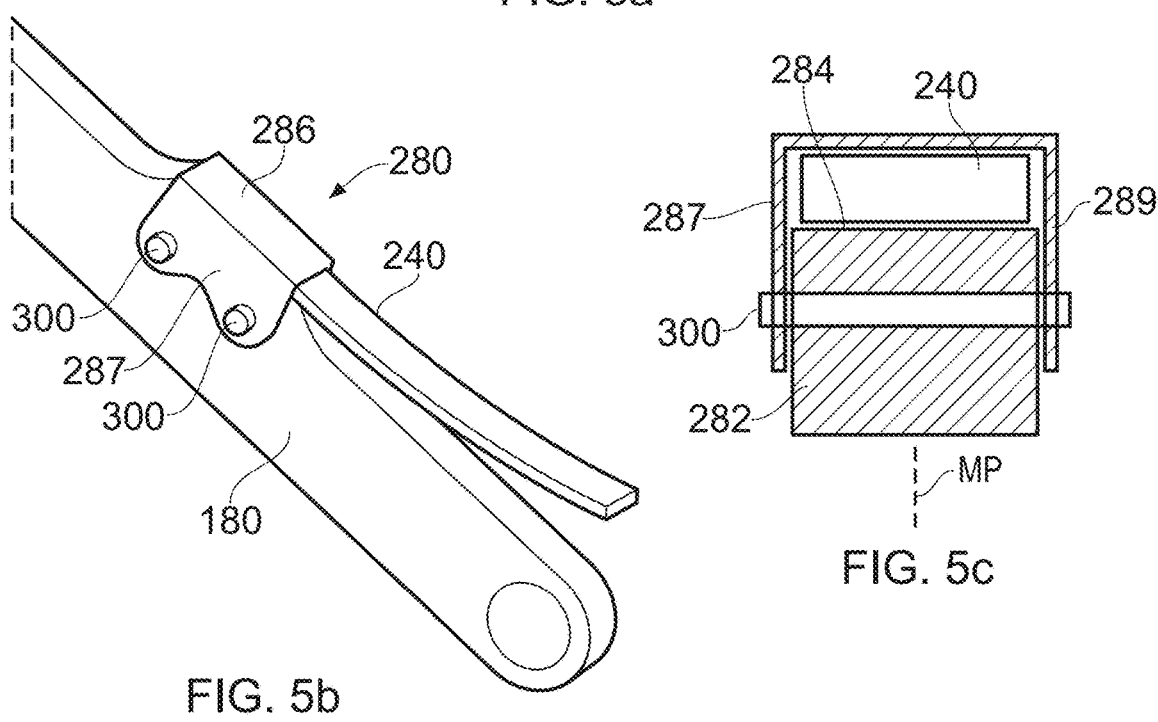
FIG. 5b
FIG. 5c

AIRCRAFT LANDING GEAR ASSEMBLY

This application is a U.S. National Phase application of PCT International Application No. PCT/EP2021/054824, filed Feb. 26, 2021, which claims the benefit of EP20160347.9, filed Mar. 2, 2020, both of which are incorporated by reference herein.

BACKGROUND TO THE INVENTION

An aircraft landing gear assembly is generally movable between a deployed condition, for take-off and landing, and a stowed condition for flight.

An actuator is provided for moving the landing gear between the deployed condition and the stowed condition. This actuator is known in the art as a retraction actuator, and more than one can be provided. A retraction actuator can have one end coupled to the airframe and another end coupled to the main strut such that extension and retraction of the actuator results in movement of the main strut between deployed and stowed conditions.

A brace or stay is generally provided to support the orientation of the main fitting when the landing gear is in the deployed condition. A stay generally includes a two bar linkage that can be unfolded to assume a generally aligned, over centre condition in which the stay is locked to inhibit movement of the main fitting. When the stay is broken, it no longer reacts movement of the main fitting and the main fitting can be moved by the retraction actuator to the stowed condition. Some main landing gear assemblies include a pair of stays coupled to a common main fitting.

A lock link is generally provided in conjunction with each stay to maintain the stay in the locked condition. A lock link generally includes a two bar linkage that can be unfolded to assume a locked over centre condition to inhibit movement of the stay. The lock link must be broken to enable the stay to be folded, thereby permitting the main fitting to be moved by the retraction actuator towards the stowed condition.

It is common for a landing gear assembly to be arranged to move towards the deployed condition in the event of a failure of the retraction actuator. Initially, the landing gear assembly will move by way of gravity, and in doing so the stay is forced to move towards the locked condition. One or more down lock springs are generally provided to assist in moving the landing gear assembly to the deployed condition and locking it in that state by moving the lock link over centre. Down lock springs also inhibit the lock link accidentally being unlocked.

A down lock spring is generally a metal coil spring, which can be coupled between the lock link and another part of the landing gear assembly, such as an arm of the stay assembly. However, more recent developments in landing gear assemblies have seen the use of fibre composite leaf springs, such as that described in European Patent Publication No. EP3069993. Fibre composite leaf springs can deflect sufficiently to accommodate articulation movement of the lock link as the landing gear assembly moves between the deployed and stowed conditions. The fibre composite leaf spring has various advantages over conventional metal coil down lock springs; for example, the leaf spring can have a low profile in comparison to a coil spring, reducing the likelihood of impact damage, in addition to being less susceptible to vibratory loading.

The present inventors have devised an improved landing gear assembly that can have one or more of the following advantages relative to the prior art: reduced risk of stress concentrations in the composite material of the leaf spring, reduced risk of delamination of the composite material of the leaf spring, reduced likelihood of component failure and/or performance loss, and a simple and low cost manufacturing process.

SUMMARY OF INVENTION

According to a first aspect of the invention, there is provided an aircraft landing gear assembly comprising a first landing gear element movably coupled relative to a second landing gear element to move between a first condition and a second condition. The aircraft landing gear assembly further comprises a fibre composite leaf spring formed from a plurality of composite layers and arranged between the first and second elements, the leaf spring being arranged to bend when the first element moves from the first condition to the second condition. The fibre composite leaf spring comprises a first region and a second region, wherein the number of composite layers in the first region is greater than the number of composite layers in the second region. The landing gear assembly further comprises a mounting assembly arranged to engage the first region of the leaf spring to couple the leaf spring to the first landing gear element.

In embodiments of the present invention, the leaf spring can be coupled to a landing gear element without post-processing of the composite material. This can reduce the likelihood of stress concentrations in the composite material that might occur if the composite spring were drilled through, such as if a bolted end fitting were used. The present invention can also reduce the risk of delamination of the composite layers and can generally reduce the likelihood of component failure or loss of performance that might occur if the composite leaf spring were post-processed, for instance by drilling or cutting. This arrangement of the present invention can also make the landing gear assembly simple and inexpensive to manufacture.

The fibre composite leaf spring can comprise two outer composite layers separated by one or more inner composite layers, wherein at least one of the one or more inner layers is shorter in length than the outer layers and resides within the first region of the leaf spring such that the number of layers in the first region of the leaf spring is greater than the number of layers in the second region of the leaf spring.

With this arrangement, the shorter composite layers can be internal (i.e. not on a surface of the laminate stack), which can prevent the shorter composite layers from being exposed. This can increase the strength of the composite spring and can also reduce the risk of component failure due to e.g. delamination.

The first landing gear element can be arranged to move between the first condition and the second condition in a movement plane. The plane of each composite layer of the leaf spring can be arranged perpendicular to the movement plane, and the mounting assembly can be arranged to hold the leaf spring such that the composite layers of the leaf spring remain perpendicular to the movement plane. However, the composite layers can be arranged in different orientations. Additionally, each composite layer can be made of fibres, which can lie at various angles.

With this arrangement, the mounting assembly can prevent the leaf spring from twisting and can ensure that the bending of the leaf spring is in a direction perpendicular to the composite layers. This can reduce the risk of component failure, and can improve the spring properties of the leaf spring.

The first region of the leaf spring can be tapered to a reduced thickness towards the second region of the spring, such that the first region of the spring has a wedge-shaped profile. The mounting assembly can comprise a wedge-shaped slot arranged to receive the first region of the leaf spring.

With this arrangement, the first end of the leaf spring can be mechanically restrained in the mounting assembly in the longitudinal direction and can be prevented from escaping through the front of the mounting assembly.

The taper can be a single-sided taper (i.e. a taper built up in one direction), with a correspondingly shaped slot. This can accommodate assembly clearances and can also be easy to manufacture as the bottom surface can be flat.

The mounting assembly can comprise a first portion and a second portion. The second portion can comprise a cover.

With this arrangement, the mounting assembly can comprise separate pieces. This can increase the ease with which the landing gear, including the leaf spring, is assembled and/or disassembled (e.g. when placing the first region of the leaf spring in the mounting assembly).

The first and second portions of the mounting assembly can together define the wedge-shaped slot.

With this arrangement, the first portion of the leaf spring can be placed in and/or removed from the wedge-shaped slot with increased ease.

The leaf spring can comprise an end surface. The first portion of the mounting assembly can comprise an abutment, wherein the abutment is arranged to engage the end surface of the leaf spring.

This arrangement can mechanically restrain the first portion of the leaf spring in the mounting assembly in the longitudinal direction, and can prevent the first portion of the leaf spring from escaping the mounting assembly through the back of the mounting assembly. This arrangement can also provide a 'hard-stop' against which the leaf spring can push, which can improve the transfer of loads to the spring when the first landing gear element moves from the first to the second conditions.

The leaf spring can comprise a top surface and a bottom surface, the top and bottom surfaces being separated by the composite layers of the leaf spring. The cover of the second portion of the mounting assembly can be arranged to extend over the top surface of leaf spring at the first region. The first portion of the mounting assembly can comprise a mounting surface arranged in contact with the bottom surface of the leaf spring at the first region. The mounting surface, abutment and cover can together define the wedge-shaped slot.

With this arrangement, the first portion of the leaf spring can be mechanically restrained at the bottom surface, top surface and end surface, and can be prevented from moving along the movement plane.

The first portion of the mounting assembly can be formed from the first landing gear element.

With this arrangement, the number of components of the mounting assembly can be reduced, which can reduce the weight of the landing gear. The strength of the first portion of the mounting assembly can also be increased as a result of being formed from the first landing gear element.

The first portion of the mounting assembly can define the wedge-shaped slot.

The cover can comprise side walls arranged to confine the first region of the spring within the wedge-shaped slot.

With this arrangement, lateral movement of the spring can be prevented, and the first region of the spring can be prevented from escaping the mounting assembly through the side of the mounting assembly.

The side walls of the cover can be arranged to be fixed to the first landing gear element via one or more bolts mounted in a direction normal to the movement plane of the first and second landing gear elements.

With this arrangement, load transferred to the cover in the movement plane, for example during bending of the spring, can be loaded on the bolt(s) in shear. This can increase the load-resistance of the bolts and can reduce the risk of component failure. In other words, this arrangement can prevent large forces being loaded onto the thread of the bolt(s).

The one or more bolts can extend into the first landing gear element such that tightening of the bolts forces the first and second portions of the mounting assembly to apply a clamping force onto the first region of the spring.

The first landing gear element can be one of a side stay or lock link and optionally the mounting assembly can be fixedly coupled to the side stay, and/or movably coupled to the lock link.

With this arrangement, the first region of the spring can be fixed to and move in dependence on the side stay. With this arrangement, the first region of the leaf spring can also be coupled to, but move independently of, the lock link, such that the range of movement of the first landing gear element can be different from the range of movement of the first region of the leaf spring.

The first and second landing gear elements can be pivotally coupled, and the first and second conditions can be arranged to occur when the first and second landing gear elements are at predetermined angles to one another.

The fibre composite leaf spring can be formed from fibre-reinforced composite material with a nominally organic polymer matrix. The composite layers of the leaf spring can be arranged in a composite ply stack, and can be arranged in different orientations.

The leaf spring can be elongate, and relatively wide in comparison to its thickness at the first and/or second regions. The first and second regions of the leaf spring can be different regions along the length of the leaf spring, and the thickness of the spring at the first and second regions (and at any given point along the length of the spring) can be determined by the number of composite layers at that region. Therefore, the leaf spring can have a variable thickness along its length.

The width of the leaf spring can also be variable along the length of the leaf spring. This arrangement can provide additional stiffness.

The taper of the leaf spring can be on the bottom surface of the leaf spring, the top surface of the leaf spring, or both. There can be a plurality of shorter, inner composite layers and the length of each shorter layer can be staggered, such that the thickness of the spring is varied gradually. The end surface of the leaf spring can be substantially perpendicular to the shortest composite layer.

The first region of the leaf spring can be at an end of the leaf spring and can comprise and/or be adjacent to the end surface of the leaf spring. The second region of the leaf spring can be adjacent to the first region.

The mounting assembly can be movably coupled to the first and/or second landing gear element, for instance via a pivot link. Optionally, the mounting assembly can be movably coupled to the lock link via a pivot link, wherein the pivot link is coupled at one end to the mounting assembly via a first pivot pin, and the pivot link is coupled at the other end to the lock link via a second pivot pin.

The leaf spring can further comprise a third region at an opposite end of the spring to the first region, wherein a number of composite layers of the third region is greater than a number of composite layers of the second region. The landing gear can also further comprise a second mounting assembly arranged to engage the third region of the leaf spring such that the third region is coupled to the second element of the landing gear.

BRIEF DESCRIPTION OF THE DRAWINGS

Embodiments of the invention will now be described, strictly by way of example only, with reference to the accompanying drawings, of which:

FIG. 4 is a schematic representation of a fibre-composite leaf spring according to the invention;

FIGS. 5a to 5d are schematic representations of a portion of a landing gear assembly according to the invention;

DESCRIPTION OF EMBODIMENTS

Figure 1:
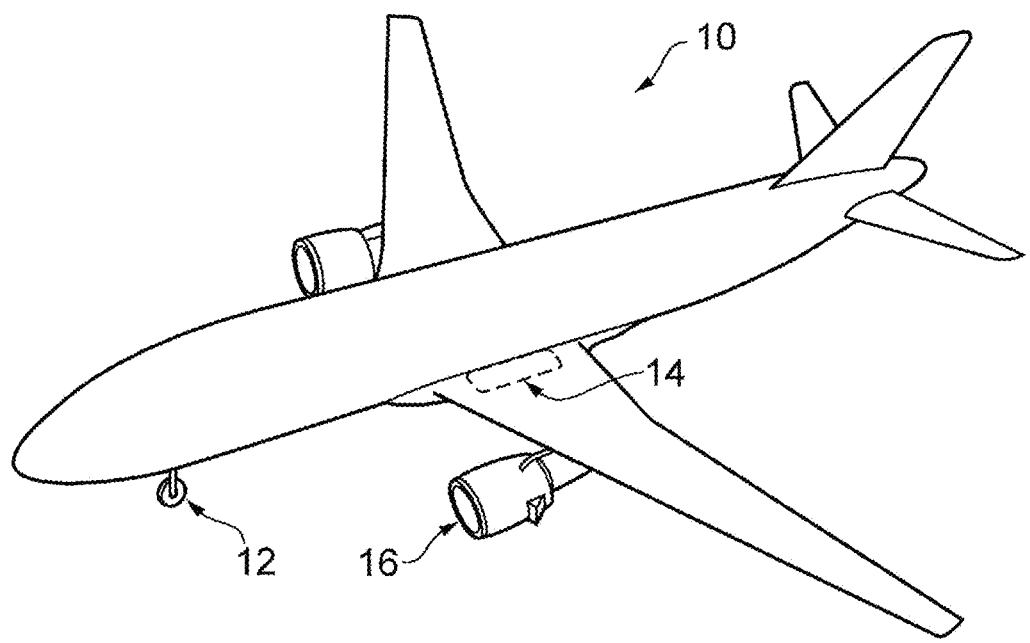
FIG. 1 is a schematic representation of an aircraft.

FIG. 1 is a diagram of an aircraft 10. The aircraft 10 includes assemblies such as a nose landing gear 12, main landing gear 14 and engines 16. Other aircraft assemblies will be apparent to the skilled person. An aircraft assembly can be a group of interconnected parts which are arranged to be fitted to one or more other aircraft assemblies as a unit. The term aircraft as used herein includes aeroplanes, helicopters, UAVs and the like.

Referring now to FIGS. 2a to 2e, an aircraft assembly, namely an aircraft landing gear assembly, is shown generally at 14. The landing gear assembly 14 includes a foldable stay 18, a lock link 20 and a down lock spring assembly 22 mounted to the stay 18 and arranged to urge the lock link 20 to assume a locked state. The landing gear assembly also includes a main shock absorber strut 24, comprising a main fitting 26 and a sliding tube 28, as well as a wheel and brake assembly 30.

The aircraft landing gear assembly is movable between a deployed condition, for take-off and landing, and a stowed condition for flight. An actuator (not shown) is provided for moving the landing gear between the deployed condition and the stowed condition. This actuator is known in the art as a retraction actuator, and more than one can be provided. A retraction actuator can have one end coupled to the airframe and another end coupled to the main strut such that extension and retraction of the actuator results in movement of the main strut between deployed and stowed conditions.

Figure 2A:
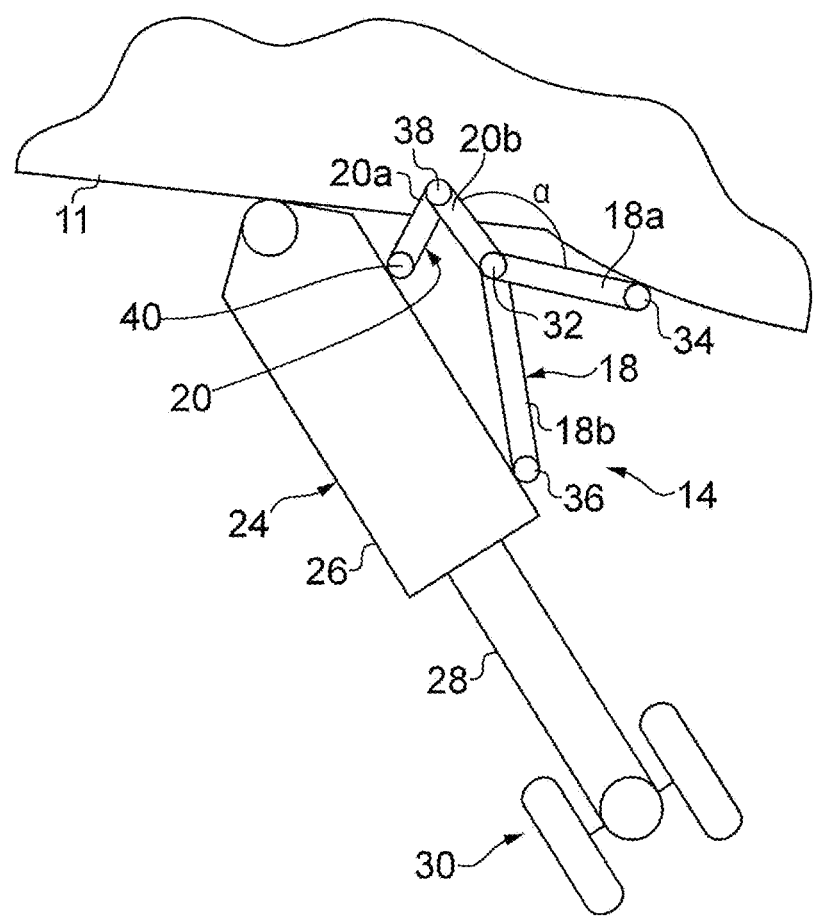
FIGS. 2a to 2e are schematic representations of a landing gear assembly.
Figure 2B:
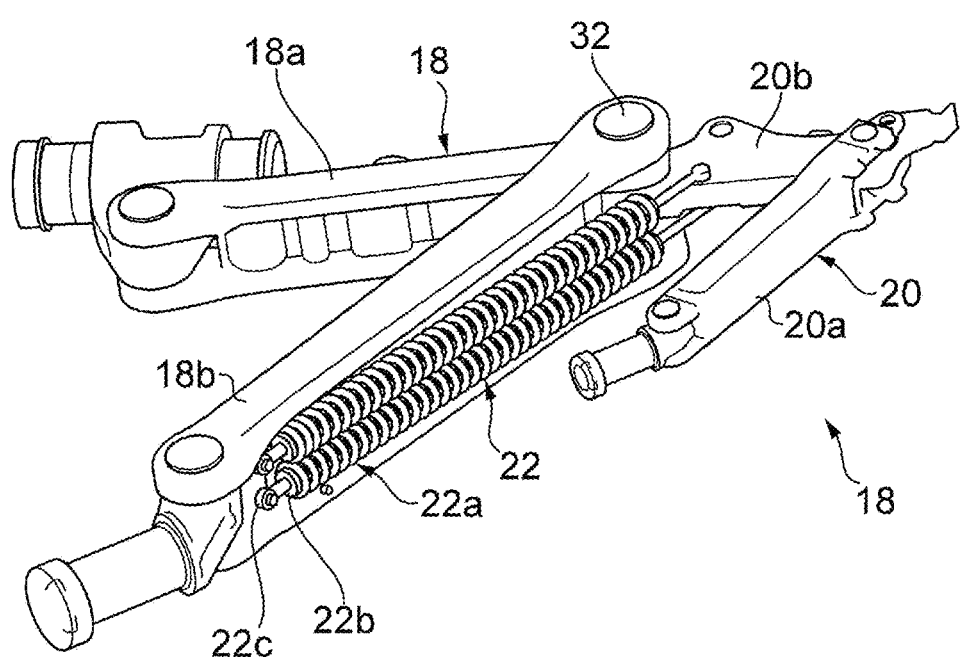
Figure 2C:
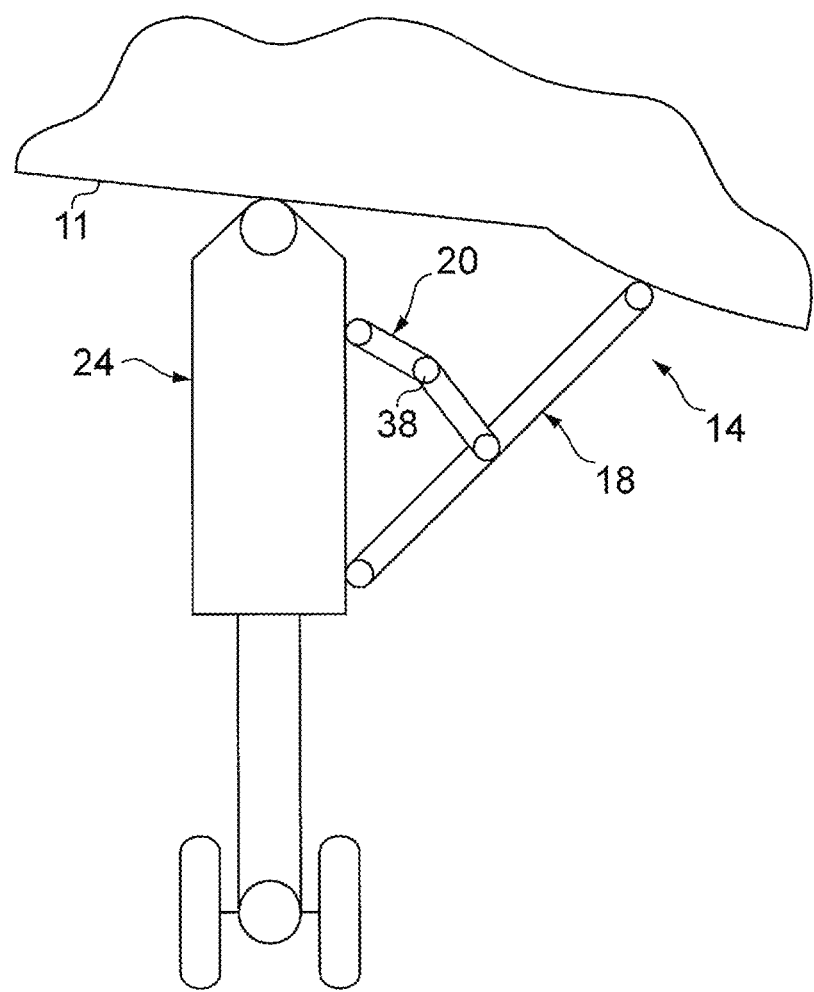

The stay 18 serves to support the orientation of the main fitting 26 when the landing gear is in the deployed condition. The stay 18 generally includes a two bar linkage that can be unfolded to assume a generally straight or aligned, over centre condition in which the stay 18 is locked to inhibit movement of the main fitting, as shown in FIGS. 2c and 2e. When the stay is broken, it no longer prevents pivotal movement of the main fitting 26 and the main fitting 26 can be moved by the retraction actuator towards the stowed condition, as shown in FIG. 2a. During flight the stay 18 is arranged in the folded condition, while during take-off and landing the stay 18 is arranged in the generally straight or aligned condition. Some main landing gear assemblies include a pair of stays coupled to a common shock absorbing strut.

The stay 18 has an elongate upper stay arm 18a having a lower end defining a pair of lugs pivotally coupled via a pivot pin 32 to a pair of lugs defined at an upper end of an elongate lower stay arm 18b. The stay arms 18a and 18b can therefore pivotally move relative to one another about the pivot pin 32. The upper end of the upper stay arm 18a defines a pair of lugs that are pivotally coupled to a lug of a connector 34 which in turn is pivotally coupled to the airframe 11. The lower end of the lower stay arm 18b defines a pair of lugs pivotally coupled to a lug of a connector 36 which in turn is pivotally coupled to the main fitting 26.

The lock link 20 has an elongate upper link arm 20a having a lower end pivotally coupled to an upper end of an elongate lower link arm 20b via a pivot pin 38. The link arms 20a, 20b can therefore pivotally move relative to one another about the pivot pin 38. An upper end of the upper link arm 20a defines a pair of lugs that are pivotally coupled to a lug of a connector 40 which in turn is pivotally coupled to the main strut 26. A lower end of the lower link arm 20b defines a lug that is pivotally coupled to lugs of the stay arms 18a, 18b via the pivot pin 32. Lugs of the upper stay arm 18a are disposed between the lugs of the lower stay arm 18b and the lugs of the lower link arm 20b.

Figure 2D:
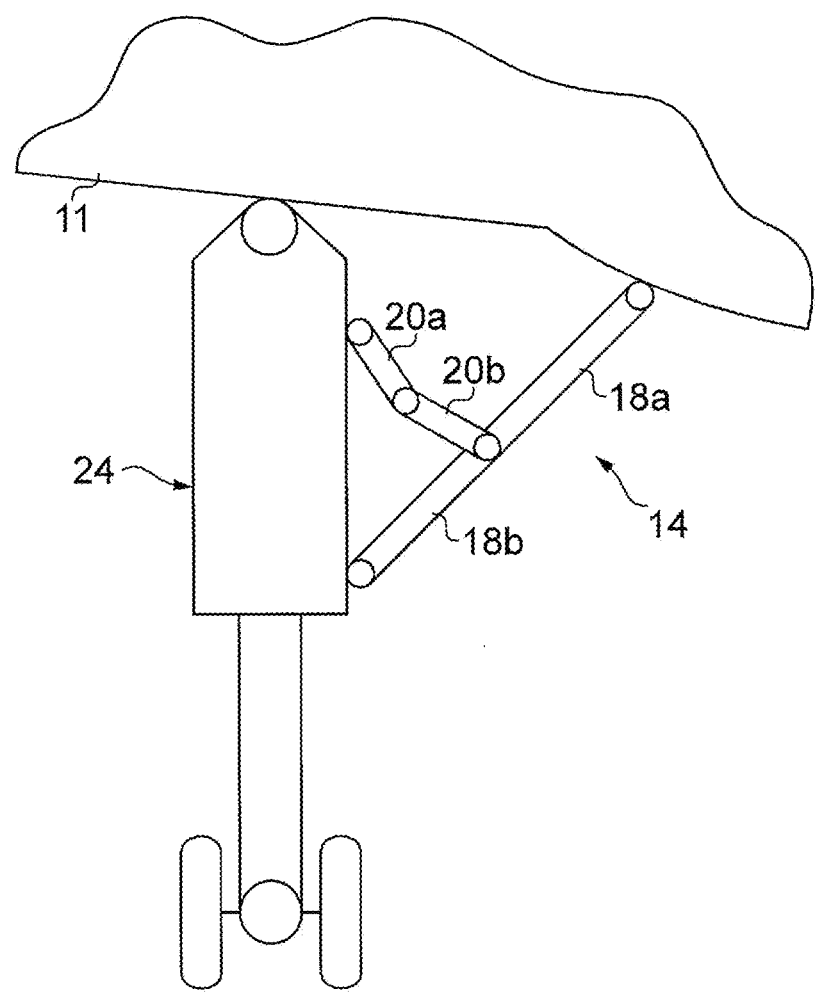
Figure 2E:
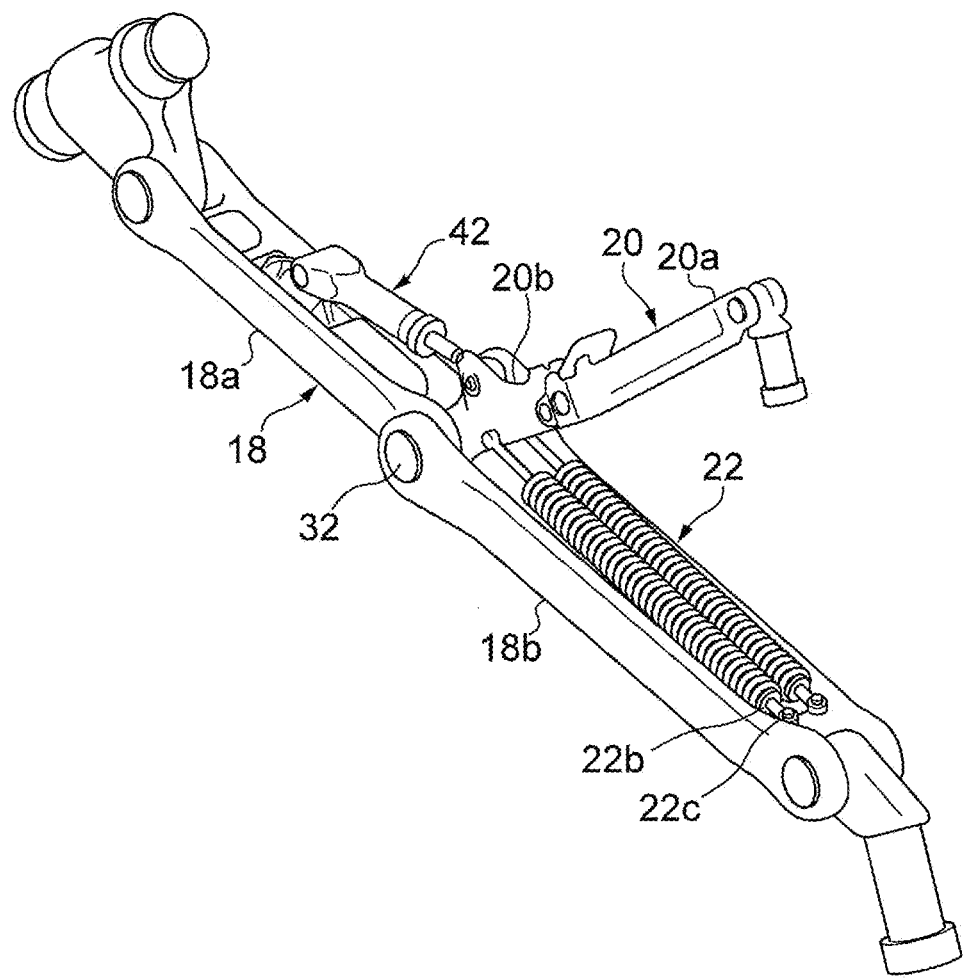

When the lock link 20 is in the locked condition, as illustrated in FIGS. 2d and 2e, the upper and lower link arms 20a, 20b are generally longitudinally aligned or coaxial, and can be 'over-centre', such that the lock link 20 is arranged to oppose a force attempting to fold the stay 18, so as to move the landing gear assembly from the deployed condition towards the stowed condition. The lock link 20 must be broken to enable the stay 18 to be folded, thereby permitting the main fitting 26 to be moved by the retraction actuator towards the stowed condition.

One or more down lock springs 22 are generally provided to assist in moving the landing gear assembly to the deployed condition and locking it in that state by making the lock link. Down lock springs 22 also inhibit the lock link accidentally being unlocked. Down lock springs 22 are generally metal coil springs, which can be coupled between the lock link and another part of the landing gear assembly, such as an arm of the stay assembly, as shown in FIGS. 2b and 2e.

The spring assembly 22 is arranged to bias the lock link 20 towards the locked condition by way of spring tension. A distal end of the spring 22a is coupled to the lower stay arm 18b via a lower engagement formation 22b which in turn is coupled to an anchor point defined by the lower connector 22c.

The coil spring of the spring assembly 26 is at its shortest when the landing gear assembly is in the deployed condition, as shown in FIG. 2e, and at its longest when the landing gear assembly approaches the stowed condition, as shown in FIG. 2b. As the landing gear assembly is retracted towards the stowed condition, the spring of each spring assembly extends, resulting in increased spring load and torsional stress.

Referring to FIG. 2e, a lock stay actuator 42 is coupled between the upper stay arm 18a and lower link arm 20b and arranged to pivotally move the link arms 20a, b so as to 'lock' and 'unlock' the lock link 20, as illustrated in FIG. 2c. The actuator 42 can break the lock link 20 against the down lock spring bias, allowing the landing gear assembly to be folded and stowed as described previously.

As will be appreciated from the above, various aircraft assemblies include a first part which is movable relative to a second part. With such an arrangement, a spring is often present to urge the first part into a predetermined position relative to the second part, such as for the lock link 20 mentioned above.

Figure 3A:
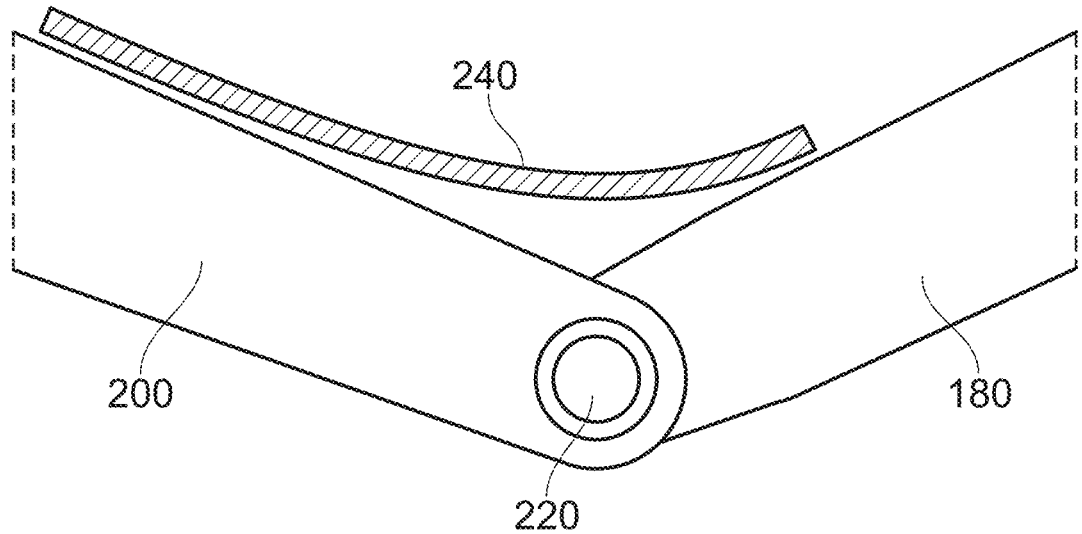
FIGS. 3a to 3b are schematic representations of a portion of a landing gear assembly.
Figure 3B:
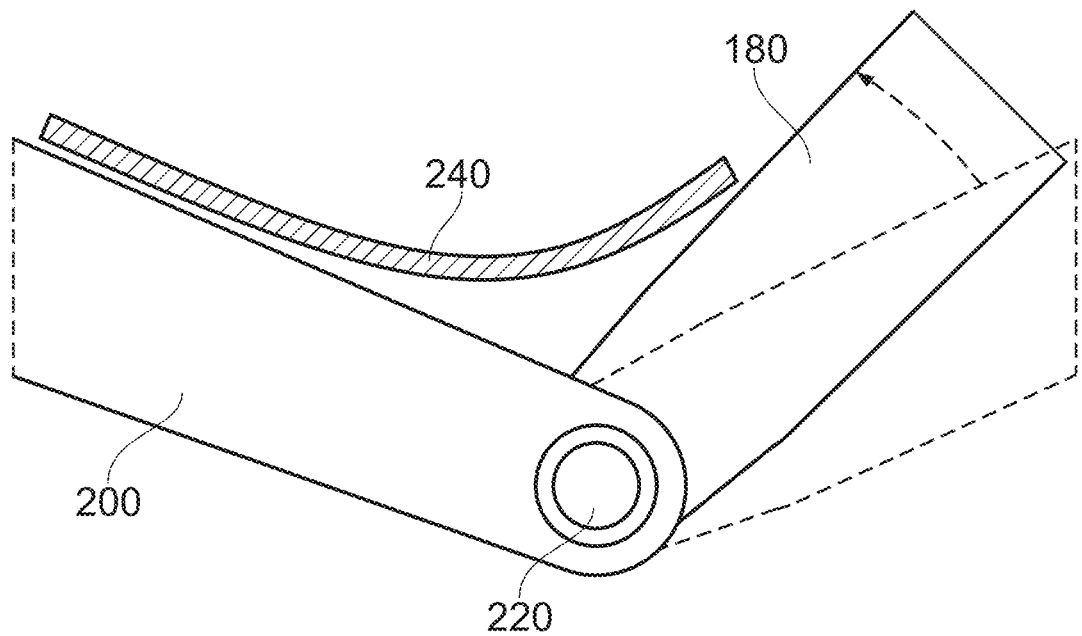

FIGS. 3a and 3b show part of a landing gear assembly, in which a first landing gear element 180 is movably coupled to a second landing gear element 200. As will be appreciated, the first and second landing gear elements shown in FIGS. 3a and 3b could be any movably coupled elements described in relation to FIGS. 2a-e, and the movement of the landing gear elements can be controlled by an actuator, such as described above. For example, the first landing gear element 180 can be one of a lock link or side stay, and the second landing gear element can be the other of a lock or side stay, as per the arrangement in e.g. FIG. 2b. The terms first and second are used merely to differentiate the elements and any aspect described in reference to one is equally applicable to the other. The first and second landing gear elements 180, 200 can be movable relative to one another along a movement plane into different conditions. In the example arrangement shown in FIGS. 3a and 3b, the first landing gear element 180 is pivotally coupled to the second landing gear element 200 at pivot point 220 (e.g. via a pin joint) and can move into different relative positions. Where, for instance, the first and second landing gear elements are pivotally coupled via a pin joint, the movement plane can be perpendicular to the direction of the pin of the pin joint. Each relative position, or condition, defines an angle between the first and second landing gear elements 180, 200. FIG. 3b illustrates a pivotal movement of the first landing gear element relative to the second landing gear element from a first condition (shown in FIG. 3a, and by the dashed line in FIG. 3b) to a second condition (shown in FIG. 3b). Of course, the relative movement can involve movement of either or both of the landing gear elements. In the second condition, shown in FIG. 3b, the angle between the landing gear elements is smaller than that in the first condition.

A leaf spring 240 is arranged between the first landing gear element 180 and the second landing gear element 200, such that as the first landing gear 180 element moves relative to the second landing gear element 200, the spring flexes. As shown in FIGS. 3a and 3b, moving the first landing gear element 180 from the first condition to the second condition applies a force to the spring 240 causing it to bend in a bending plane corresponding to the movement plane. Equally, the restorative force of the spring will act to bias the first and second landing gear elements 180, 200 apart, i.e. to increase the angle between the landing gear elements. In this way, the leaf spring 240 can bias the first landing gear element 180 into the first condition. The skilled person will appreciate how, for the operation described in relation to FIGS. 2a-e, the first condition can be the over-centre condition of the lock link.

Although not shown in FIGS. 3a and 3b, the leaf spring 240 is coupled to the first landing gear element 180 and/or the second landing gear element 200.

In the present invention, the fibre composite leaf spring 240 is coupled to the first landing gear element 180 via a mounting assembly, which engages a portion of the leaf spring to mechanically restrain said portion in position, thereby avoiding the need to drill through or post-process the composite material of the leaf spring 240. As discussed above, this can reduce the risk of delamination of the composite layers of the leaf spring that could be associated with post-processing, such as for bolted end fittings. The general principle, which will be described by way of examples in more detail below, involves the mounting assembly at least partially enclosing a portion of the leaf spring and defining a space that is too small for the enlarged region of the spring to pass through. In this way, the mounting assembly can engage the enlarged region of the spring and prevent it from moving in at least one direction along the longitudinal axis.

FIG. 4 illustrates a profile view of a portion of a fibre composite leaf spring 240 according to the present invention. The leaf spring is a fibre composite leaf spring formed from a plurality of composite layers arranged in a composite ply stack. The composite material can be a fibre-reinforced composite material with a nominally organic polymer matrix. The spring 240 can be elongate and relatively wide in comparison to its thickness, with the length of the spring extending along a longitudinal axis A1 (a tangential axis at a particular point along the spring's length). The composite layers are built up in the z-direction, substantially perpendicular to the longitudinal axis A1 of the spring, but can have a variety of orientations (e.g. rotations about the z-axis). The plane of each composite layer LP can be substantially perpendicular to the bending plane of the spring 240, which corresponds to the movement plane MP of the first and second landing gear elements as shown in FIG. 5c.

The illustrated portion of the leaf spring 240 comprises a first region R1 and a second region R2, where the number of composite layers 260 in the first region R1 is greater than the number of composite layers is the second region R2. The regions R1 and R2 shown in FIG. 4 are merely for illustrative purposes and, as will be appreciated, the first and second regions R1, R2 could be defined as any two parts of the leaf spring in which the number of composite layers in the first region is greater than the number of composite layers in the second region.

The thickness of the leaf spring (in the z-direction illustrated in FIG. 4) at a particular point along the length of the spring can be dependent on the number of composite layers 260 at that particular point. As such, the first region R1, which has a greater number of layers, can have a greater thickness than the second region R2, which has fewer layers. As shown in FIG. 4, the leaf spring has a built-up tapered profile, in which the thickness of the leaf spring is gradually reduced from the first region R1 to the second region R2. The tapered profile shown in FIG. 4 is built up in one direction (+z-direction), but it will be appreciated that the profile of the spring could be tapered in either direction, or both (+z and/or −z). A single-sided taper (i.e. a taper built up in one direction) can accommodate assembly clearances and can also be easy to manufacture as the bottom surface is flat. In either case, the first region R1 shown in the embodiment of FIG. 4 has a substantially wedge-shaped profile. It will of course be appreciated that other shapes are possible without departing from the general principle described above.

The composite leaf spring can also have a number of internal composite layers 260 separating two outer layers defining a top surface 262, and a bottom surface 264, as illustrated in FIG. 4. The outer layerstop surface and bottom surface 262, 264 are exposed and define top and bottom surfaces of the leaf spring, while the inner layers 260 are intermediate layers in the composite ply stack, which are adjacent to other composite layers both above and below.

The number of composite layers of the leaf spring, and thus the thickness of the leaf spring, can be varied using one or more shorter inner layers 266 in the composite ply stack, as illustrated in FIG. 4. The shorter inner layers 266 can be used to stagger the composite layers to produce a tapered thickness rather than an abrupt step. As shown in FIG. 4, at least one shorter inner layer 266 resides within the first region R1 of the leaf spring, such that the first region R1 comprises at least one more composite layer than the second region R2. The internal tapering of the composite material of the leaf spring 240, i.e. that the shorter composite layers 260 are inner composite layers, means that the ends of the shorted composite layers are not exposed on the surface. This can increase the strength of the first region of the composite spring and reduce the risk of component failure due to e.g. delamination.

FIGS. 5*a*-*c* illustrate a mounting assembly 280 according to an embodiment of the invention. As described above in reference to FIG. 4 above, the leaf spring 240 has a first region R1 that has a greater thickness (i.e. greater number of composite layers) than that of a second region. As shown in FIG. 5*a*, the mounting assembly 280 can define a wedge-shaped slot that substantially corresponds to the wedge-shape of the first region R1 of the leaf spring 240, such that the first region R1 of the spring can be positioned, and mechanically restrained, within an internal cavity of the mounting assembly. The mounting assembly 280 can comprise a first portion 282, such as the mounting surface 284 shown in FIGS. 5*a* and 5*c*, and a second portion 286, such as the cover 286 shown in FIGS. 5*a*-*c*. When the first region R1 of the spring is coupled to a landing gear element, the bottom surface 264 of the spring can be adjacent to and in contact with the mounting surface 284, and the top surface 262 of the spring can be adjacent to and in contact with the underside of the top portion of the cover 286. In general, any covering element provided to retain the leaf spring can optionally have a smoothed corner along the open edge (i.e. at the end through which the spring extends). This can reduce edge loading as the spring bends. For instance, in the embodiment of FIGS. 5*a*-*c*, the front (i.e. open) edge of the cover 286 can be curved to define a lip 291 having radius R, such that the spring can flex without contacting a sharp edge.

The mounting assembly 280 in FIGS. 5*a*-*c* is shown to substantially enclose the first region R1 of the leaf spring 240, except for an opening at the front through which the remaining length of the leaf spring 240 extends. However, the mounting assembly 280 can alternatively only partially enclose the first region R1 (e.g. along the length and/or width) without departing from the general principle described above.

In FIG. 5*a*, the cover 286 is tapered on the inside of the top surface to create the wedge-shaped slot. However, alternatively or additionally, the mounting surface 284 of the first portion 282 of the mounting assembly 280 can be tapered to create the wedge-shaped slot, as appropriate for the corresponding shape of the first region R1 of the leaf spring 240. The wedge-shape of the mounting assembly 280 cooperates with the wedge-shape of the first region R1 of the spring 240 to prevent longitudinal movement of the spring 240 along the longitudinal axis A1. The mounting assembly 280 also acts to prevent twisting of the spring 240 about the longitudinal axis A1.

The first portion 282 of the mounting assembly 280 can also optionally include an abutment 288. The abutment 288 can alternatively be part of the second portion 286, such as the cover 286, of the mounting assembly, or can be formed partially from the first portion 282 and partially from the second portion 286 of the mounting assembly. The abutment 288 can act as a hard-stop up against which the end surface 290 of the leaf spring 240 can push, thereby preventing the leaf spring 240 from moving along the longitudinal axis A1 in the other direction (i.e. the opposite direction to the mechanical restraint provided by the wedge-shape of the mounting assembly 280). As will be appreciated by the skilled person, at least a component of the force from the bending of the spring, for instance as the first landing gear element 180 moves from the first condition to the second condition, will be transmitted in this direction, i.e. act to push the end surface 290 of the spring against the abutment 288.

The first portion 282 of the mounting assembly 280 can be integrally formed from the first landing gear element 180, or can alternatively be a separate piece fixedly coupled to the first landing gear element 180. The abutment 288 can be integrally formed from the first portion 282 of the mounting assembly, and/or the second portion 286 of the mounting assembly (such as the cover 286), or can be a separate piece.

Figure 5D:
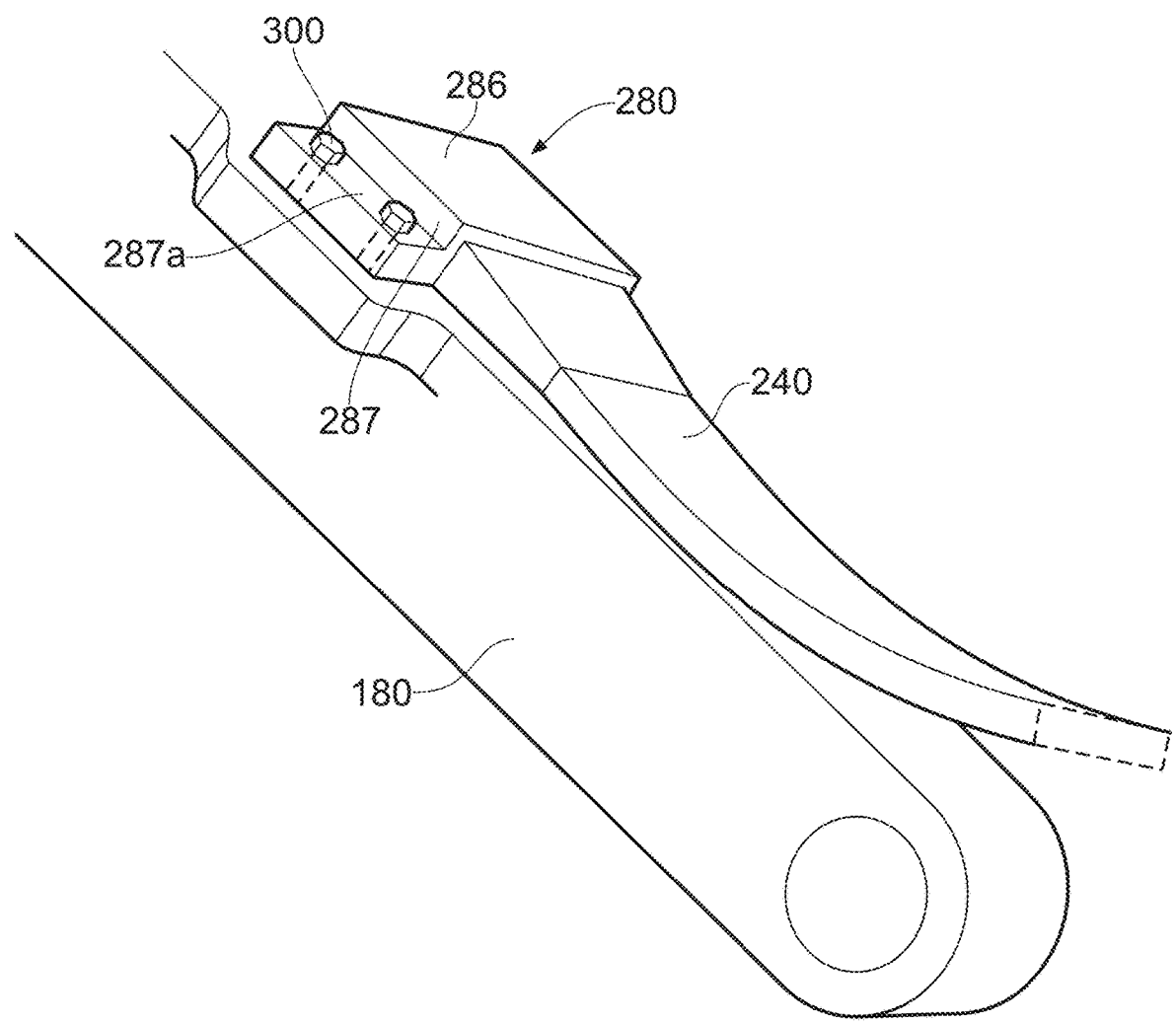

The cover can comprise side walls 287, 289, as illustrated in FIGS. 5*b* and 5*c*, which can be fixedly coupled to the first portion of the mounting assembly 280 via a bolting arrangement. The one or more bolts 300 can be mounted in shear, i.e. perpendicular to the bending plane of the spring, for improved loading of the bolts. Alternatively, or additionally, the cover 286 can be fixedly coupled to the first landing gear element 180 with a bolting arrangement such that the wedge-shaped slot defined by the mounting assembly can be adjusted, for instance through tightening of the vertically-mounted bolts, to be slightly undersized relative to the first portion R1 of leaf spring, such that the first region R1 of the leaf spring is positively clamped in place by a clamping action of the first and second portions of the mounting assembly. For instance, FIG. 5*d* shows a mounting assembly 280 wherein the cover 286 is fixedly coupled to the first landing gear 180 element via one or more (preferably four) vertically-mounted bolts 300 (i.e. parallel to the bending/movement plane). In other words, torque applied to the bolts can be translated to bearing pressure over the surface of the leaf spring covered by the mounting assembly. Vertically mounted bolts can increase the ease with which a torque can be calculated for a bearing pressure appropriate for the composite material of the leaf spring, but the bolts can be arranged at any angle. Returning to the embodiment shown in FIGS. 5*b* and 5*c*, the cover 286 is a U-shaped bracket that extends over and/or encloses the first region R1 of the leaf spring 240. The side walls 287, 289 act to confine the first region R1 of the spring 240 within the wedge-shaped slot of the mounting assembly 280 and prevent lateral (defined relative to the longitudinal axis A1) movement of the first region R1 of the spring. For the arrangement of FIG. 5*d*, at least a portion 287*a* of the side walls 287 extends perpendicular to the movement plane, which is fixedly coupled to the first landing gear element 180. The first landing gear element 180 can include a corresponding portion fixedly coupled to the portion 287*a* of the cover via the bolting arrangement 300.

Figure 6A:
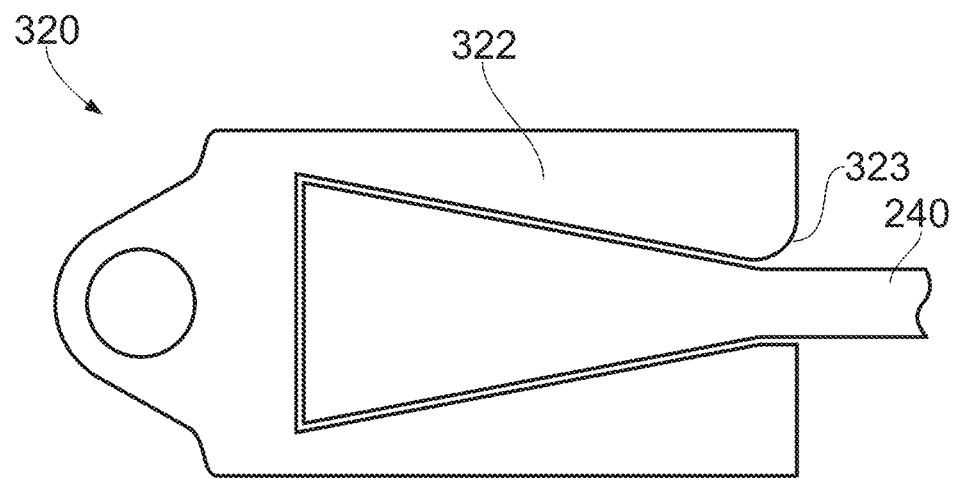
FIGS. 6a to 6c are schematic representations of a portion of a landing gear assembly according to the invention.
Figure 6B:
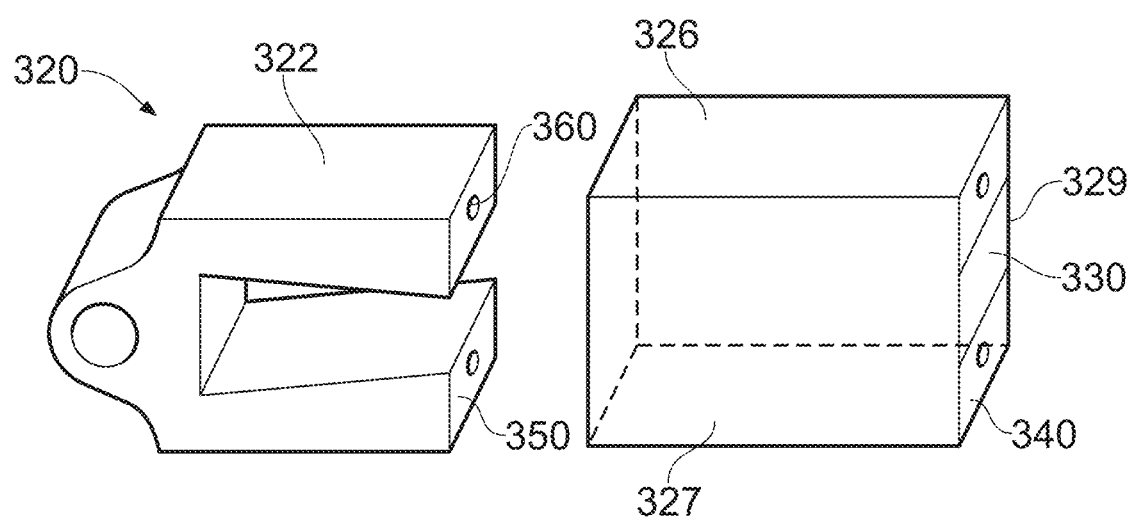

FIGS. 6*a* and 6*b* show another embodiment of the mounting assembling 320 according to the present invention. Here the wedge-shaped slot is defined in a first portion 322 of the mounting assembly 320, which can be a slot fitting. The wedge-shaped slot defined by the first portion 322 of the mounting assembly 320 provides the same function as the wedge-shaped slot of the first and second portions 282, 286 in FIGS. 5*a*-*c*, i.e. to receive and mechanically restrain the first region R1 of the leaf spring 240. Although the first region R1 of the leaf spring 240 and the first portion 322 of the mounting assembly 320 shown in FIG. 6*a* are tapered on both sides (i.e. both the top and bottom surfaces), this is merely an example. As discussed above in relation to FIG. 4 and FIGS. 5*a*-*d*, the taper can be on just one side. FIG. 6*b* illustrates a cover portion 326, which can be a collar (shown on the right in FIG. 6b) open at both ends, arranged to slide over and enclose the first portion 322. The cover 326 illustrated in FIG. 6b has side walls 327, 329 that, similarly to the side walls of the cover in FIGS. 5b and 5c, prevent lateral movement of the first region R1 of the spring 240. The leaf spring 240 can extend through one open end 330 of the collar in the longitudinal direction. The cover 326 can further comprise one or more front portions 340 that extend at least partially over one or more corresponding front portions 350 of the first portion 322 of the mounting assembly 320. The one or more front portions 340 of the cover 326 can be fixedly coupled to corresponding front portion(s) 350 of the first portion 322 of the mounting assembly 320 via one or more bolts 360, as shown in FIG. 6b.

Figure 6C:
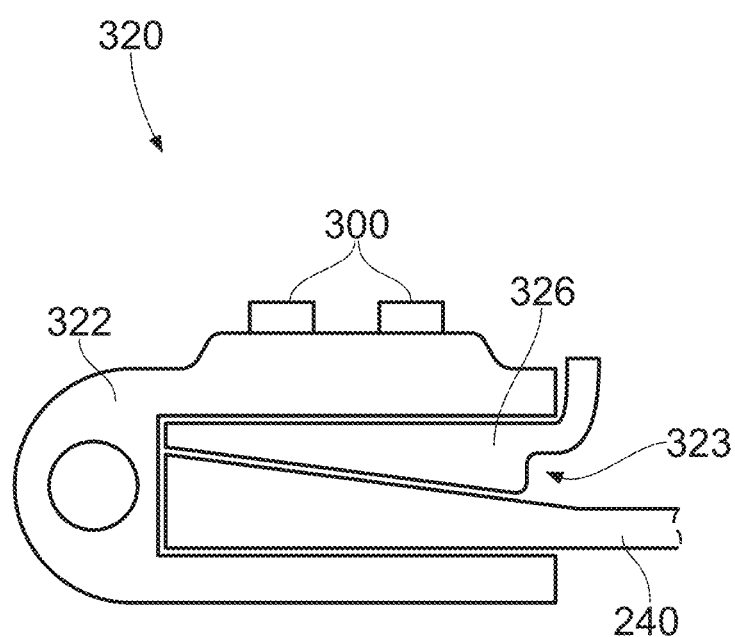

Another embodiment of the mounting assembly 320 according to the present invention is shown in FIG. 6c. The mounting assembly 320 of the FIG. 6c is substantially the same as that of FIGS. 6a and 6b except that the second portion 326 of the mounting assembly 320 comprises a shim. As shown in FIG. 6c, the first portion 322 of the mounting assembly 320 is a c-shaped slot fitting with a substantially rectangular-profiled slot, and the shim 326, which is arranged within the rectangle slot, is tapered to provide the wedge-shaped slot. In this arrangement, the bolts 300 can be mounted vertically and the first portion 322 (e.g. c-shaped slot fitting), tapered shim 326 and bolting arrangement (e.g. four vertically mounted bolts) can be arranged to force the shim onto the leaf spring at a predefined load. The first portion 322 of the mounting assembly can comprises threaded holes through which the bolts 300 pass, such that tightening of the bolts forces the ends of the bolts 300 against the shim 326, which in turn pushes the shim 326 against the leaf spring 240. In other words, torque applied to the bolts 300 can be translated to bearing pressure applied by the shim 326 over the surface of the leaf spring 240 covered by the shim 326. Vertically mounted bolts can increase the ease with which a torque can be calculated for a bearing pressure appropriate for the composite material of the leaf spring, but other bolting arrangements can be used. The friction between the leaf spring 240 and the shim 326, and the shim 326 and the ends of the bolts 300, can be sufficient to retain the shim 326 within the rectangle slot of the first portion 322. Alternatively or additionally, the surface of the shim 326 adjacent to the first portion 322 can be provided with recesses arranged to receive the ends of the bolts 300 and prevent the shim 326 from sliding out. Although not shown in FIG. 6c, the mounting assembly 320 can comprise side walls as described above. The side walls can be part of a cover portion, as also described above, or can be individually fastened to each side of the first portion 322 of the mounting assembly 320.

As discussed above in relation to FIGS. 5a-c, the second portion of the mounting assembly shown in FIGS. 6a, 6b and 6c can optionally include a rounded corner 323 to reduce edge loading. Alternatively, or additionally, a cut away portion can be provided as illustrated in FIG. 6c, for the same effect.

Figure 7:
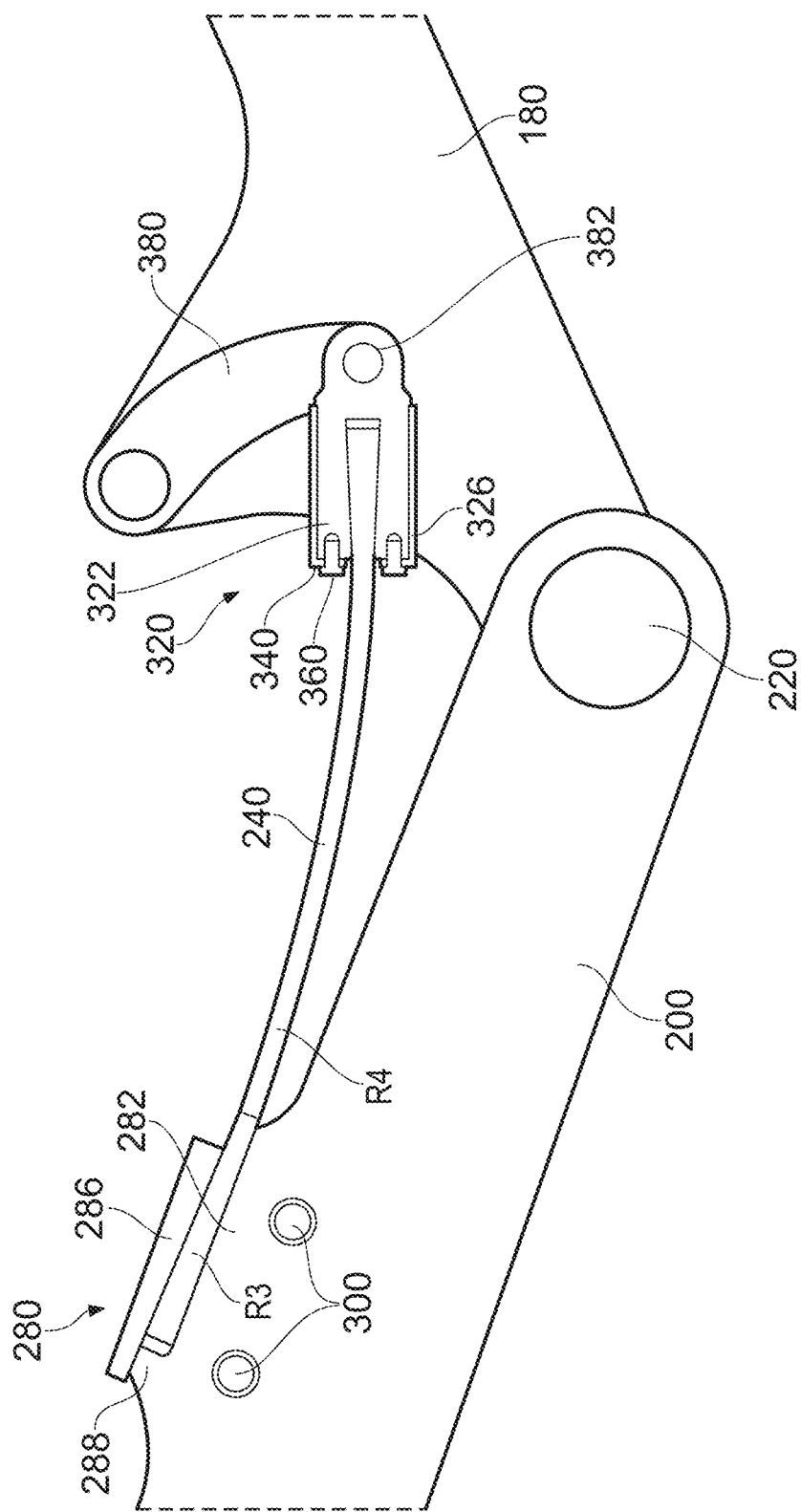
FIG. 7 is a schematic representation of a portion of a landing gear assembly according to the invention.

In embodiments described above in reference to FIGS. 5a-c and 6a-b, the enlarged first region R1 of the leaf spring 240 is at one end of the leaf spring 240, such that the first region is adjacent to the end surface 290 of the spring. However, the enlarged first region R1 need not be at the end of the spring, but could be any point along the length of the spring. Equally, the leaf spring 240 can comprise multiple enlarged regions, for example two enlarged regions, one at each end. An example of this is illustrated in FIG. 7, which incorporates the mounting assembly 280 of FIGS. 5a-c, to couple one end of the spring to the second landing gear element 200, and the mounting assembly 320 of FIGS. 6a-b, to couple the other end of the spring to the first landing gear element 180. This particular arrangement can increase the ease of integration of the spring into the assembly. In the embodiment shown in FIG. 7, the first landing gear element 180 can be a lock link, and the mounting assembly 320 can be movably coupled to the first landing gear element 180, for instance via the movable link 380 illustrated in FIG. 7. The movable link can comprise a pivot link pivotally coupled via a first pin joint 382 at one end to the mounting assembly, and pivotally coupled at the other end to the lock link via a second pin joint. The pivot link-mounting assembly connection 382 can include a spherical bearing configured to isolate the spring from torsional load induced by lateral movement of the side stays. This can reduce twisting of the leaf spring in the event that the side stay arms are distorted. Although the mounting assembly 320 of FIGS. 6a-b is used in FIG. 7 to couple one end of the spring to the first landing gear element 180, and the mounting assembly 280 of FIGS. 5a-c is used in FIG. 7 to couple the other end of the spring to the second landing gear element, any of the mounting assembly arrangements described could be provided at either end of the spring. For instance, the mounting assembly of FIG. 5d could be used to couple one end of the spring to a side stay and the mounting assembly of FIG. 6c could be used to couple the other end of the spring to the lock link.

It should be noted that the above-mentioned embodiments illustrate rather than limit the invention, and that those skilled in the art will be capable of designing many alternative embodiments without departing from the scope of the invention as defined by the appended claims. In the claims, any reference signs placed in parenthesis shall not be construed as limiting the claims. The word "comprising" does not exclude the presence of elements or steps other than those listed in any claim or the specification as a whole. The singular reference of an element does not exclude the plural reference of such elements and vice-versa. Parts of the invention can be implemented by means of hardware comprising several distinct elements. In a device claim enumerating several parts, several of these parts can be embodied by one and the same item of hardware. The mere fact that certain measures are recited in mutually different dependent claims does not indicate that a combination of these measures cannot be used to advantage.

The invention claimed is:

1. An aircraft landing gear assembly comprising:
  a first landing gear element movably coupled relative to a second landing gear element to move between a first condition and a second condition;
  a fibre composite leaf spring formed from a plurality of composite layers and arranged between the first and second elements, the leaf spring being arranged to bend when the first element moves from the first condition to the second condition, wherein the fibre composite leaf spring comprises a first region and a second region, wherein the number of composite layers in the first region is greater than the number of composite layers in the second region; and
  a mounting assembly arranged to engage the first region of the leaf spring to couple the leaf spring to the first landing gear element, wherein the fibre composite leaf spring further comprises two outer composite layers separated by one or more inner composite layers, wherein at least one of the one or more inner layers is shorter in length than the outer layers and resides within the first region of the leaf spring such that the number of layers in the first region of the leaf spring is greater than the number of layers in the second region of the leaf spring.

2. The aircraft landing gear assembly of claim 1, wherein:
the first landing gear element is arranged to move between the first condition and the second condition in a movement plane;
the plane of each composite layer of the leaf spring is arranged perpendicular to the movement plane; and
the mounting assembly is arranged to hold the leaf spring such that the plane of each composite layer of the leaf spring remains perpendicular to the movement plane.

3. The aircraft landing gear assembly of claim 1, wherein the first region of the leaf spring is tapered to a reduced thickness towards the second region of the spring, such that the first region of the spring has a wedge-shaped profile.

4. The aircraft landing gear assembly of claim 3, wherein the mounting assembly comprises a wedge-shaped slot arranged to receive the first region of the leaf spring.

5. The aircraft landing gear assembly of claim 4, wherein the mounting assembly comprises a first portion and a second portion, wherein the second portion comprises a cover.

6. The aircraft landing gear assembly of claim 5, wherein the first and second portions of the mounting assembly together define the wedge-shaped slot.

7. The aircraft landing gear assembly of claim 6, wherein the leaf spring comprises an end surface and the first portion of the mounting assembly comprises an abutment, wherein the abutment is arranged to engage the end surface of the leaf spring.

8. The aircraft landing gear assembly of claim 7, wherein:
the leaf spring further comprises a top surface and a bottom surface, the top and bottom surfaces separated by the composite layers of the leaf spring;
the cover is arranged to extend over the top surface of leaf spring at the first region;
the first portion of the mounting assembly further comprises a mounting surface arranged in contact with the bottom surface of the leaf spring at the first region; and
the mounting surface, abutment and cover together define the wedge-shaped slot.

9. The aircraft landing gear assembly of claim 5, wherein the first portion of the mounting assembly is formed from the first landing gear element.

10. The aircraft landing gear assembly of claim 5, wherein the first portion of the mounting assembly defines the wedge-shaped slot.

11. The aircraft landing gear assembly of claim 5, wherein the cover comprises side walls arranged to confine the first region of the spring within the wedge-shaped slot.

12. The aircraft landing gear assembly of claim 11, wherein the side walls of the cover are arranged to be fixed to the first landing gear element via one or more bolts mounted in a direction normal to the movement plane of the first and second landing gear elements.

13. The aircraft landing gear assembly of claim 1, wherein the first landing gear element is one of a side stay or lock link and optionally the mounting assembly is fixedly coupled to the side stay, and/or movably coupled to the lock link.

14. The aircraft landing gear assembly of claim 1, wherein:
the first region of the leaf spring is at an end of the leaf spring;
the leaf spring further comprises a third region, at an opposite end of the leaf spring to the first region, and a fourth region, wherein the number of composite layers in the third region is greater than the number of composite layers in the fourth region; and
the landing gear assembly further comprises a second mounting assembly arranged to engage the third region of the leaf spring such that the third region is coupled to the second element of the landing gear assembly.

* * * * *